United States Patent
Long et al.

[11] 3,799,019
[45] Mar. 26, 1974

[54] BLOCK SLICER AND METHOD

[76] Inventors: Marshall Long, 9201 Bond St., Leawood, Kans. 66214; Lewis F. Alley, Kansas City, Mo.; Jack M. Miller, Prairie Village, Kans.

[22] Filed: July 19, 1973

[21] Appl. No.: 380,543

Related U.S. Application Data

[62] Division of Ser. No. 252,986, May 15, 1972.

[52] U.S. Cl. .................................. 83/342, 83/672
[51] Int. Cl. ...................... B23d 25/04, B26d 1/56
[58] Field of Search ........ 83/56, 340, 342, 344, 672

[56] References Cited
UNITED STATES PATENTS
1,974,602   9/1934   Dziedzic ........................ 83/342 X
1,973,526   9/1934   Diamond et al. ................ 83/340 X

*Primary Examiner*—Willie G. Abercrombie
*Attorney, Agent, or Firm*—Schmidt, Johnson, Hovey & Williams

[57] ABSTRACT

Solidly frozen meat blocks or the like are subjected to the action of a constantly rotating, convolute blade having outer edges along its convolutions that include discrete, helical cutting stretches and lengths for severing the blocks by successive slices into generally rectangular slabs of substantially uniform thickness suitable for further subdivision into elongated strips and thence into cubes usable, for example, in stews. By virtue of the helical nature of the blade, the machine is self-feeding, and provision is made for a dwell time during which uniform block advancement continues but slicing is interrupted. This is accomplished by use of an intermediate stretch on the blade edge which is concentric to its axis of rotation such that the block is always under the control of the blade because each succeeding slice is therefore commenced and sufficiently deepened prior to completion of the preceding slice. Each slicing action starts rapidly and the rate of slicing is progressively decreased. Moreover, the cut may start at one corner of the block and be gradually widened across the top and along one side of the block before reaching a full length cut diagonally across the block, the forces also being diagonal toward a lower, well-supported corner of the tilted block. A primary function of a trailing convolution of the blade is also block control in addition to its control of the partially cut-away slabs.

14 Claims, 13 Drawing Figures

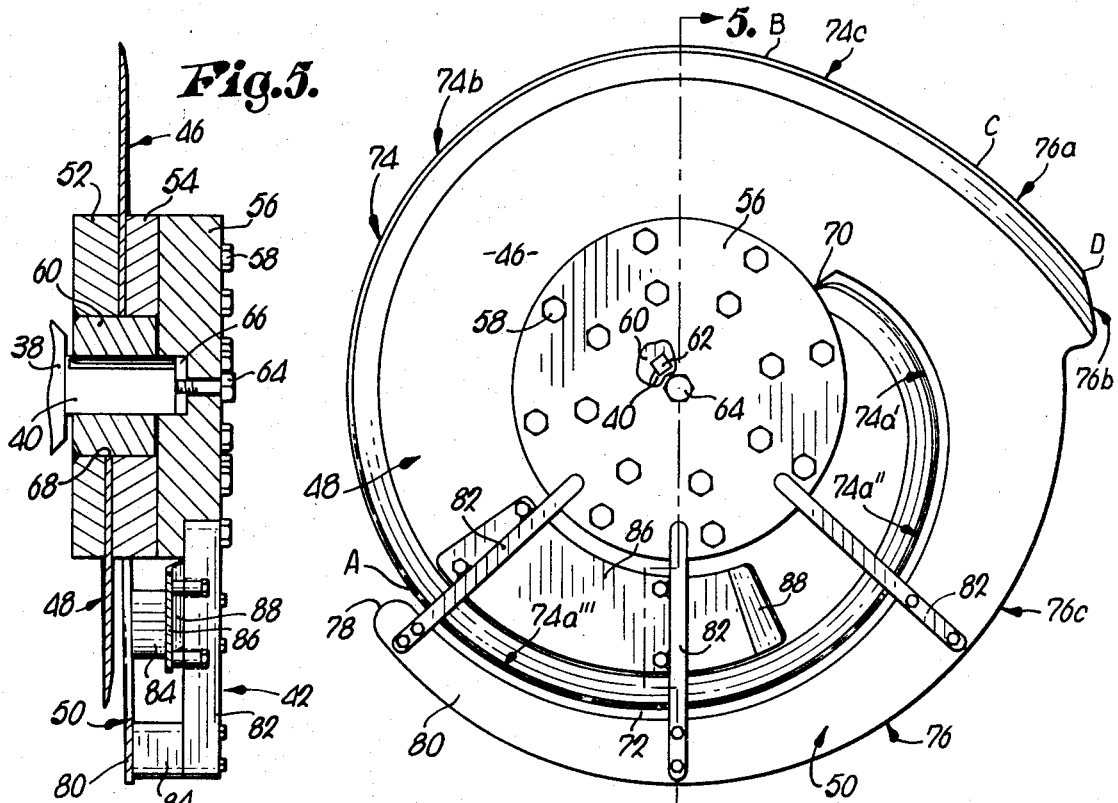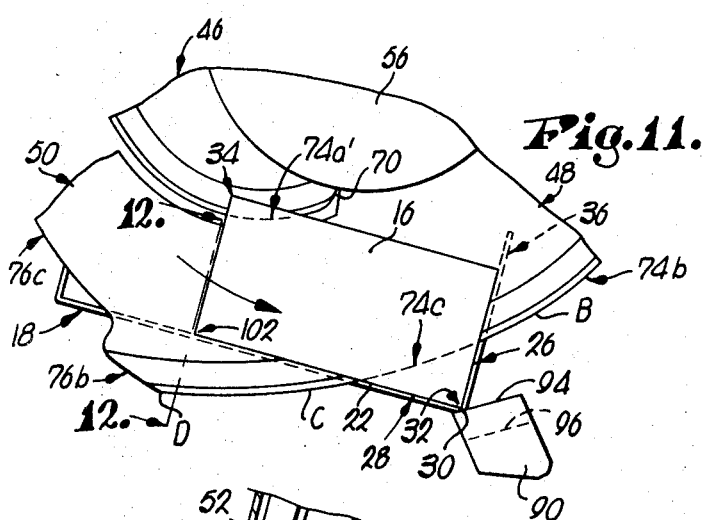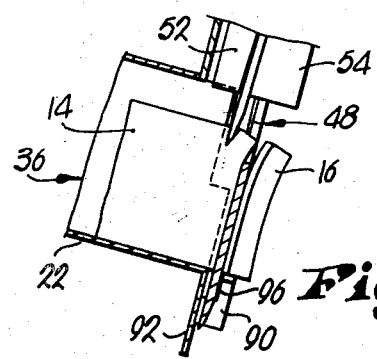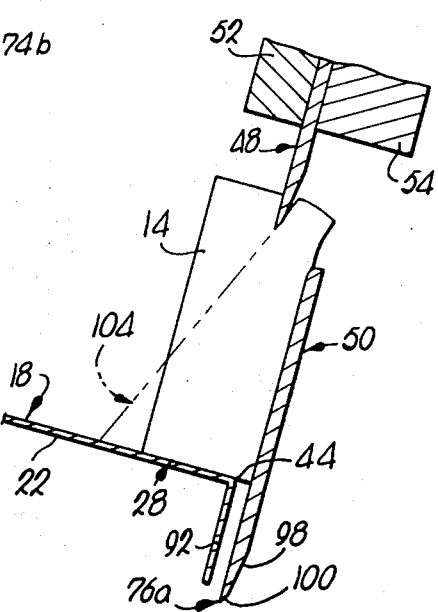

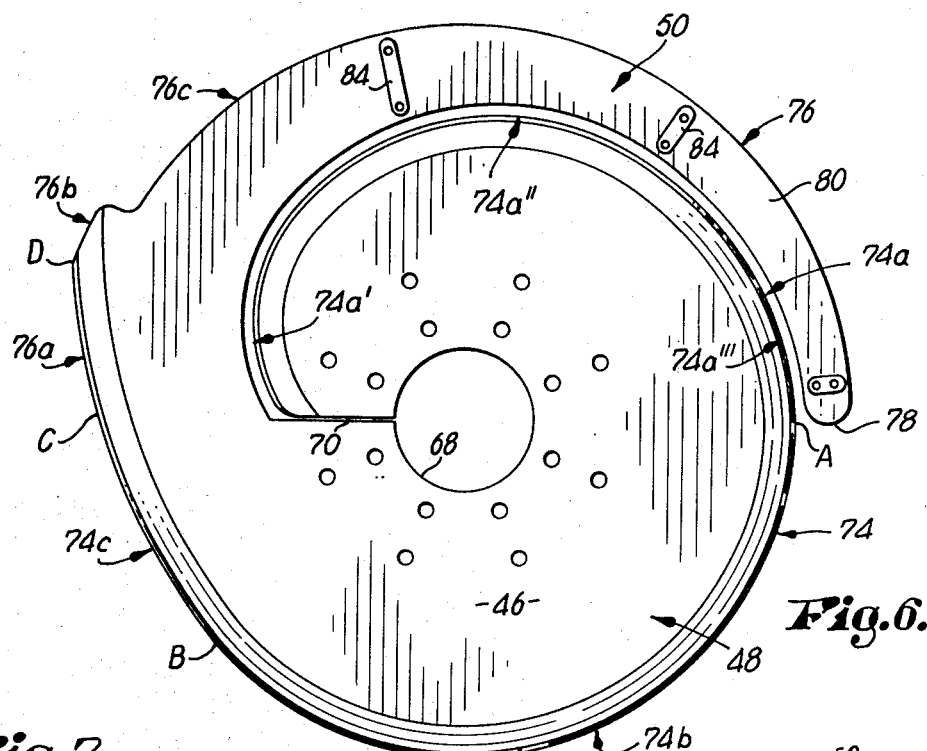
Fig. 6.
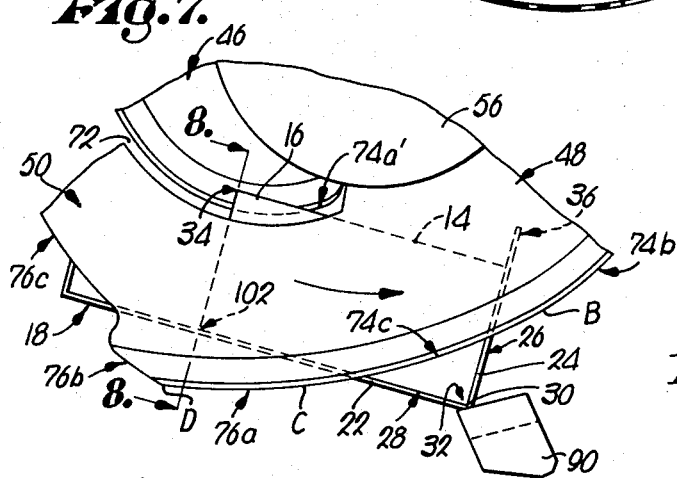
Fig. 7.
Fig. 8.
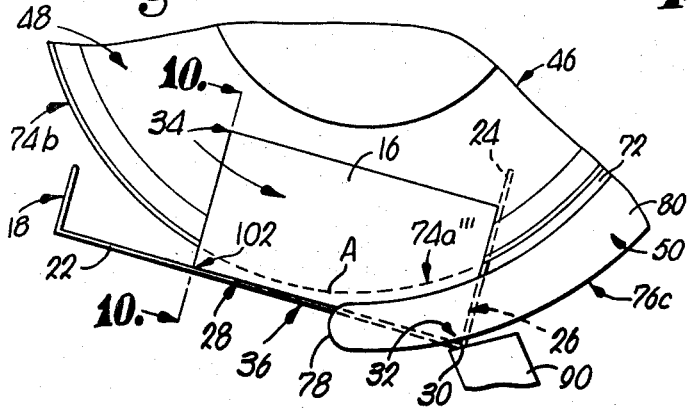
Fig. 9.
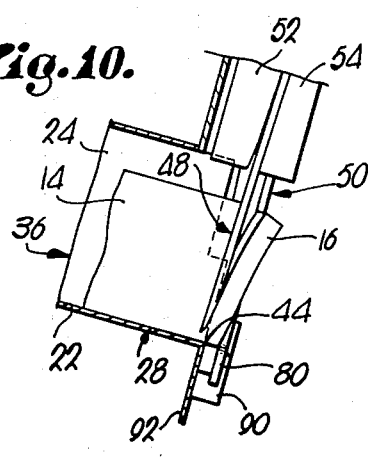
Fig. 10.

BLOCK SLICER AND METHOD

This is a division of application Ser. No. 252,986, filed May 15, 1972.

Meat cubes customarily used in stews, for example, are normally prepared from solidly frozen meat blocks which are most difficult to handle and cut. The blocks must first be severed into slabs, whereupon the slabs are reduced to elongated strips and such strips finally subdivided into the smaller cubes. This invention relates to the formation of the slabs from the blocks and has for its primary object elimination of the many pre-existing problems incident to such processing of the blocks as an initial step toward the ultimate goal of producing the cubes.

An important object of the present invention is to provide for slicing of successive slabs from the blocks without interruption or need for operator attention from the time the block is fed to the machine until it is entirely subdivided into a number of separate slabs.

Another important object of the present invention is to provide for automatic and continuous slicing of slabs from blocks in such manner as to assure substantial identity in size and shape of all of the slabs produced from all blocks of similar nature.

Still another important object of the present invention is the provision of a cutter which exercises such complete control of the block and the slabs being cut therefrom as to maintain steady advancement of the blocks thereby with equal spacing of all of the slices therethrough regardless of variances in the size, shape and condition of the blocks which are successively fed to the cutter.

A further object of the present invention is to produce high quality slabs from meat blocks by the provision of a machine and method which neither damages the block or the slabs in any way during the process nor causes waste of any appreciable amount of meat product.

In the drawings:

FIG. 4 is an elevational view of the outer face of the rotor on the same scale as FIG. 1;

FIG. 5 is a cross-sectional view taken on line 5—5 of FIG. 4;

FIG. 6 is an elevational view of the outer face of the rotor blade removed from its supporting shaft, the radial arms, arcuate plate and outer disc of FIG. 4 having also been removed, and the blade rotated to a position different from FIG. 4;

FIG. 7 is a fragmentary view, similar to FIG. 4, of the blade associated with a block and illustrating commencement of the first slice;

FIG. 8 is a fragmentary cross-sectional view taken on line 8—8 of FIG. 7;

FIG. 9 is a view similar to FIG. 7 showing the position of the blade just prior to commencement of the dwell time;

FIG. 10 is a cross-sectional view taken on line 10—10 of FIG. 9;

FIG. 11 is a view similar to FIGS. 7 and 9 showing the position of the blade as it nears completion of one slice and commences the next succeeding slice;

FIG. 12 is a cross-sectional view taken on line 12—12 of FIG. 11; and

FIG. 13 is a view similar to FIGS. 8, 10 and 12, but on an enlarged scale, illustrating the slicing action at the time the block is almost entirely cut away into individual slabs.

Block 14, which may consist of solidly frozen meat, has as its dimensions, for example only, an 8 inch thickness, a 16 inch width and a 20 inch length, all variable, of course, and not necessarily uniform. The thickness of each slab 16 to be cut from the block 14 may, also for example only, be approximately 1 ¼ inches.

Figure 2:
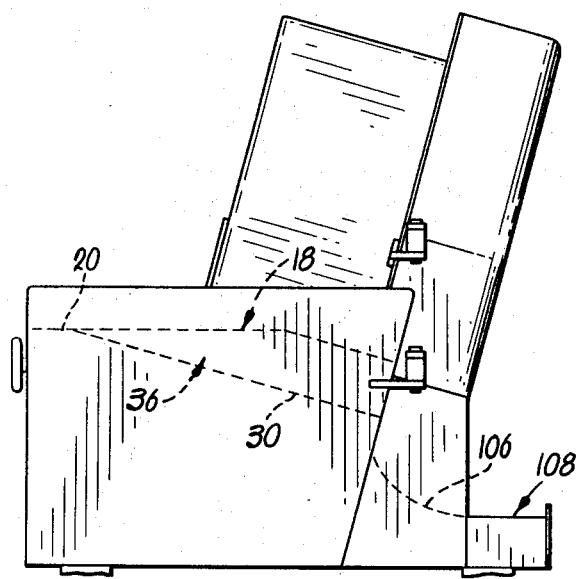
FIG. 2 is a fragmentary side elevational view of the machine on a reduced scale.
Figure 3:
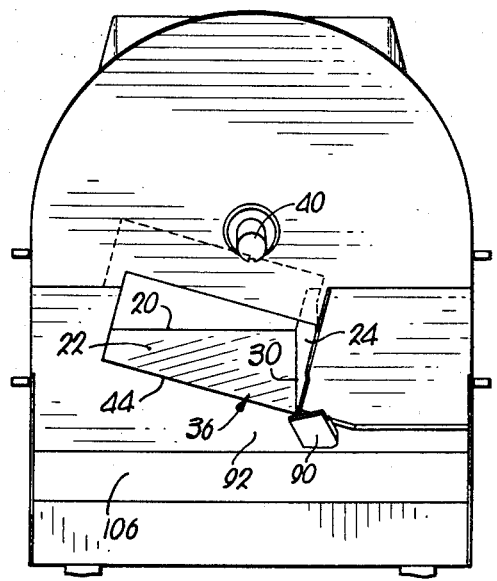
FIG. 3 is a fragmentary elevational view of the machine on the same scale as FIG. 2, with the rotor and its hood removed and looking into the discharge end of the machine.
Figure 1:
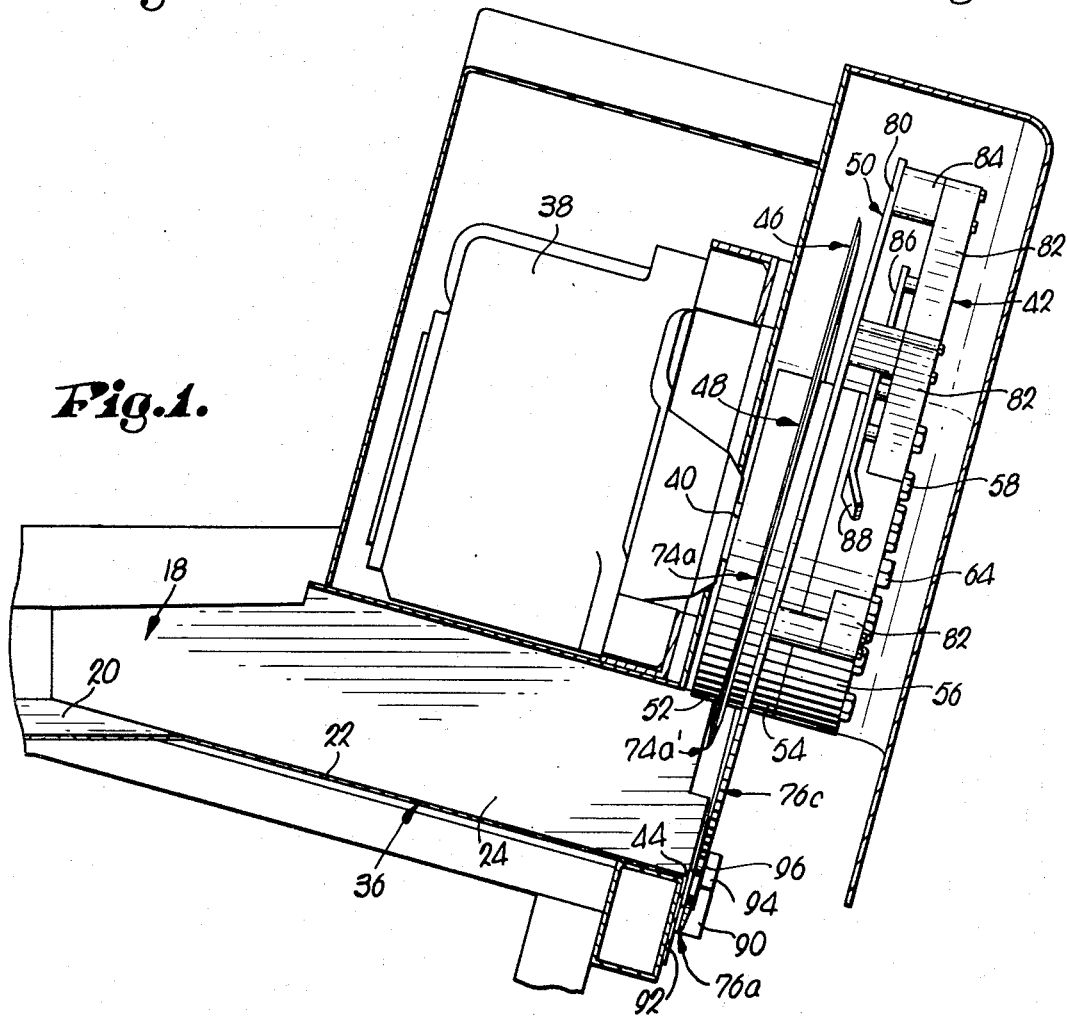
FIG. 1 is a fragmentary, vertical cross-sectional view of a block slicer made according to the present invention, capable of use in carrying out the block slicing method embodied in the invention.

A support 18, along which the block 14 slides, includes a horizontal table 20 terminating in a bottom wall 22 which not only slopes downwardly (about 20°, for example) in the direction of advancement of the block 14, as best seen in FIGS. 1–3, 8, 10, 12 and 13, but which slopes laterally (about 10°, for example) of such direction of advancement, as best seen in FIGS. 3, 7, 9, 11 and 13. The support 18 also includes an inclined sidewall 24 along which side 26 of block 14 slides as bottom 28 of the block 14 slides along the wall 22. The wall 24 is normal to the wall 22 and merges therewith in an elongated corner 30 which slidably receives and supports lowermost longitudinal corner 32 of the block 14.

The disposition of the corner 30 is such as to cause the cutting action across the block 14 to be diagonal of the latter from uppermost longitudinal corner 34 of the block 14 toward the corner 30 of the support 18 and through the corner 32 of the block 14. The upper and lower ends and the top of V-shaped trough 36 thus presented are, of course, open.

A speed reducer 38 rigidly supported above the trough 36, and which may be driven by an electric motor, not shown, is provided with an inclined output shaft 40 that has its axis of rotation essentially parallel to the longitudinal axes of the corners 30 and 32, and therefore, the path of travel of the block 14. The shaft 40 rigidly supports a rotor 42 at lower end 44 of the trough 36 for rotation about the axis of the shaft 40.

The rotor 42 includes a helical blade 46 coiled about the shaft 40 and having its convolutions 48 and 50 pitched to feed or advance the block 14 continuously and at a uniform rate down the wall 22 toward the end 44 of the trough 36, such feeding taking place primarily by the action of the lower face of the leading convolution 48.

The initially flat blade 46 is held to its convolute configuration and against axial displacement by three heavy, properly shaped, clamping discs 52, 54 and 56 that are interconnected by bolts 58 passing through the blade 46. The inner disc 52 surrounds and is welded to a tubular hub 60 that is, in turn, attached to the shaft 40 by a key 62. The intermediate disc 54 also surrounds the hub 60 whereas the outer disc 56 is clamped against the disc 54 and the hub 60. A bolt 64 through the disc 56, and through a centering cavity 66 in the disc 56 which receives the shaft 40, extends into the proximal end of the shaft 40. A hole 68 in the blade 46 receives the hub 60 to hold the blade 46 against radial displacement relative to the shaft 40.

The blade 46 has a slit 70 extending radially outwardly from the hole 68 and an arcuate slit 72 extending approximately 180 degrees helically from the outer end of the slit 70 in a clockwise direction (viewing FIG. 6) opposite to the direction of rotation of the rotor 42.

The leading convolution 48 is sharpened to present a cutting edge 74 throughout the 360° length of the convolution 48 commencing at the outer end of the slit 70 and continuing helically throughout the length of the slit 72 to approximately point A. That leading stretch 74a of the cutting edge 74 extending from the slit 70 to point A has three portions 74a', 74a'' and 74a''' whose radii increase in length progressively as point A is approached.

From point A to about point B, however, the cutting edge 74 has an intermediate stretch 74b which is concentric with the axis of the shaft 40 and which extends for a distance of approximately 135°. Finally, the cutting edge 74 of the leading convolution 48 has a helical trailing stretch 74c which extends from point B for about 45°, terminating at point C.

The trailing convolution 50 of the blade 46, provided with about a 180° length from point C, has an outer edge 76 extending from point C to a terminal end 78 of the convolution 50. The edge 76 has a helical cutting length 76a extending for about 20 degrees as a continuation of the stretch 74c, from point C to point D, a short unsharpened length 76b concentric with the axis of the hole 68, and then an appreciably longer unsharpened length 76c which extends about 160° from the length 76b to the terminal end 78. The length 76c is also concentric with the hole 68 but its radius is slightly less than that of the length 76b. Thus the zone of maximum diameter of the blade 46 is along the length 76b, and the point D becomes the point of maximum radius (for example, about 24 inches) of the blade 46.

Therefore, the blade 46 has a number of facial areas of differing radii. Along the stretch 74a, the proximal faces of the blade 46 progressively increase in width as point A is approached. Along the stretch 74b such width is the same as the maximum width at point A but remains uniform to point B, and between points B and C the radius progressively increases. The convolution 50, on the other hand, becomes progressively narrower between length 76b and the terminal end 78, presenting an elongated finger 80.

The finger 80 is held in its helical position by a number of radial bars 82 rigid to the disc 56 and bolted through spacers 84 to the finger 80. Inwardly of the stretch 74a and outwardly of the disc 56, a pair of the bars 82 support an arcuate retainer plate 86 for the slabs 16, having a leading flare 88 to present an enlarged entrance mouth.

An anvil 90 is mounted on a flange 92 depending from the bottom 22 at the end 44 of the trough 36 adjacent the corner 30 of the latter. The anvil 90 has an upper face 94 which supports the corner 32 of the block 14 as it emerges from the trough 36 and until the slab 16 is cut cleanly away from the block 14. A slot 96 in the anvil 90 clears the cutting length 76a of the edge 76 of the convolution 50.

The cutting edge 74 and the cutting length 76a are formed by an inner bevel 98 and a steeper outer bevel 100, both on the leading face of the blade 46, as best seen in FIG. 13.

OPERATION

As the block 14 is caused to slide along the table 20 and thence along the bottom 22 and sidewall 24 of the support 18, it is engaged by the blade 46 and thereafter advanced at a continuous, uniform rate solely by the action of the blade 46 during continuous rotation of the rotor 42 by the shaft 40 of the speed reducer 38.

The first slice into the block 14 is commenced by the portion 74a' of the cutting edge 74 of the convolution 48 at the upper corner 34 of the block 14 (FIGS. 7, 8), the cutting forces being diagonal toward the lower corner 32 of the block 14, which corner 32 is slidably supported by the corner 30 of the trough 36.

The initial relatively fast cutting rate decreases gradually until the portion 74a'' commences to sever the first slice at a slower rate. Again the rate decreases gradually until the portion 74a''' commences to sever the first slice at a still slower rate, which rate also decreases gradually until the point A passes through the face 26 of the block 14. By that time the first slab 16 will have been cut away from the block 14 except only for a generally triangular zone at the corner 32 of the block 14, a small zone along the bottom 28 and a small triangular zone at corner 102 of the block 14 (FIGS. 9, 10). This is because of the fact that the radius of the convolution 48 from point A to the axis of the hole 68 is less than the distance between such axis and the bottom 28, the corner 32 and the corner 102.

Therefore, since the intermediate stretch 74b of the convolution 48 is concentric to the axis of the hole 68 and has the same radius as at point A, there will be no cutting action (FIGS. 9, 10) until point B reaches the uncut triangular zone of the block 14 at the corner 102. During such dwell time, the slit 70, and therefore the leading end of the cutting portion 74a', are again approaching the upper corner 34 of the block 14.

The first slice is gradually deepened into the uncut zones by the trailing stretch 74c until point C passes through the side 26 of the block 14 (FIGS. 11, 12) and, at about the time point C reaches the corner 32, the portion 74a' will commence the second slice at the upper corner 34 of the block 14. As the length 76a of the convolution 50 gradually cuts through the remainder of the uncut triangular zone at the corner 32, the portion 74a' will gradually deepen the second slice into the block 14 (FIGS. 11, 12).

By the time the point D passes through the lower corner 32 of the block 14 to completely cut the first slab 16 away from the block 14, the portion 74a will have penetrated well into block 14 such that the blade 46 never loses control of the block 14, operating at all times to advance the block 14 uniformly and without interruption.

At all times until point B passes the center of wall 22, the convolution 48 is above the bottom 22 so that the latter backs up the slab 16 while it is being cut by edge 74. It is to be noted that although the stretch 74b passes above the bottom wall 22 of the trough 36, the stretch 74c and the length 76a shear through the block 14 well below the bottom wall 22 along the flange 92 while the block 14 is being backed up by the bottom 22 along its lowermost transverse edge at end 44 of the trough 36. Moreover, the face 94 of the anvil 90 backs up the corner 32 as the stretch 74c and the length 76a pass through the slot 96 of the anvil 90, whereupon after point D and the length 76b pass through the slot 96, the length 76c clears the anvil 90 quite adequately.

Important also is the fact that the blade 46 maintains control of the slab 16 commencing immediately upon its initial formation by the action of the portion 74a'. The upper corner of the slab 16 first to be cut away is received by the blade 46 between convolutions 48 and 50 along the portion 74a' and the length 76a, whereupon the finger 80 slides along the outermost and lowermost face of the slab 16 to prevent the latter from tilting away from the block 14 by gravity and the action of the blade 46 thereon within the slice. This holding action is augmented as the slab 16 is received by the flare 88 and by the action of the plate 86 sliding along the slab 16, such that the slab 16 is not released by the finger 80 and the plate 86 prior to commencement of the aforementioned dwell time.

Perhaps more importantly is the function performed by the finger 80 and the plate 86 as the block 14 reaches the position shown in FIG. 13. At this time, with only a small amount of the block 14 remaining to be cut away, the forces of the blade 46 thereon along dotted line 104 are such as to tend to tilt the remainder of the block 14 in reverse. That is, the blade 46 tends to lay the block 14 back down onto the bottom wall 22 causing the bottom 28 to tilt up and forwardly, slide out from under the rotor 42 and project outwardly and downwardly beyond the lower end 44 of the trough 36. The finger 80 prevents such undesirable result, and by the time the initial cut is complete, with stretch 74b passing through the slice during the dwell time, the forces in the direction of the dotted line 104 will no longer be able to adversely act on the block 14 as above described.

By virtue of the chisel type bevel 98, 100 on the leading face only of the blade 46, the block 14 snugly engages the flat trailing face of the blade 46 at all times, enhancing the advancing action of the blade 46 on the block 14 without tendency of the blade 46 to push the block 14 in reverse. If the blade 46 were also beveled on its trailing face, the blade 46 would not only tend to reverse the travel of the block 14 but tend to cause the trailing end of the block 14 to be lifted off the bottom 22 of the trough 36. But, of course, the use of a double bevel is not critical.

The primary purpose of tilting the trough 36, and therefore the block 14, is for guiding the block 14 until the blade 46 takes over control of the block 14. Therefore, starting the cut at the corner 34 is incidental and not essential. Moreover, if the block 14 being cut is, for example, wider than shown in the drawings, the initial cut will be greater on the top of block 14 than on the adjacent side. Thus, the operation of the machine is not dependent upon the tilting of block 14 as shown, in either direction.

By virtue of the downward travel of the block 14 along the bottom wall 22, the severed slabs 16 readily gravitate away from the blade 46 and may be received by a ramp 106 for delivery to a lateral conveyor (not shown) at zone 108.

It is to be recognized, as above indicated, that the dimensions of the blocks 14 to be sliced into slabs 16 will vary from block to block and will not necessarily be uniform in any given block. Thus, the exact point along the stretch 74a where cutting commences at the corner 34, or otherwise, the amount of uncut material remaining at commencement of the dwell time, and other factors detailed above, may well vary accordingly, but nonetheless, the machine is capable of accommodating considerable latitude in the sizes, shapes and types of blocks to be subdivided into substantially identical slabs. Moreover, any precise dimension of any component above recited is to be understood as exemplary only.

Having thus described the invention, what is claimed as new and desired to be secured by Letters Patent is:

1. A self-feeding machine for severing a number of slabs from a meat block or the like comprising:
   a rotor; and
   a support along which a block to be severed is advanced by said rotor and against which the block is cut into a plurality of successive slices therethrough by the rotor during advancement of the block,
   said rotor including:
   a shaft spaced from said support and rotatable about an axis generally parallel with the path of advancement of the block along the support, and
   a helical blade coiled about the shaft, secured to the latter for rotation therewith and pitched to advance the block continuously along the support during rotation of the blade,
   said blade having a convolution provided with an outermost cutting edge spaced outwardly from said axis,
   said edge having a pair of circumferentially spaced, helical stretches and a third stretch between said pair of stretches,
   said third stretch being concentric with said axis whereby to present a dwell time for each successive slice during which the cutting action is discontinued without discontinuing the advancement of the block.

2. A machine as claimed in claim 1 wherein said pair of stretches include a leading stretch and a trailing stretch, the length of said third stretch, and therefore said dwell time, being such that prior to completion of each slice by the trailing stretch the said leading stretch has commenced the next succeeding slice.

3. A machine as claimed in claim 1 wherein said blade has a second convolution trailing the first mentioned convolution for holding each slab against tilting away from the block in the direction of advancement thereof until the slice therebehind is at least substantially complete.

4. A machine as claimed in claim 3 wherein said second convolution has an edge extending to the terminal end of the second convolution, said edge of the second convolution being provided with a length which is concentric with said axis.

5. A machine as claimed in claim 4 wherein said pair of stretches include a leading stretch and a trailing stretch, the length of said third stretch, and therefore said dwell time, being such that prior to completion of each slice by the trailing stretch the said leading stretch has commenced the next succeeding slice.

6. A machine as claimed in claim 5 wherein said edge of the second convolution has a helical cutting length in leading relation to the first mentioned length, said cutting length being a continuation of said trailing stretch.

7. A machine as claimed in claim 1 wherein said support has a bottom wall along which the block slides as it is advanced, said wall sloping downwardly in the direction of advancement.

8. A machine as claimed in claim 7 wherein said wall slopes laterally of said direction of advancement.

9. A machine as claimed in claim 1 wherein said support has a bottom wall along which the block slides as it is advanced, said wall sloping laterally of the direction of advancement.

10. A machine as claimed in claim 9 wherein said support has a sidewall along which the block slides as it is advanced, said walls merging in a corner extending in parallelism with the path of advancement of the block.

11. A machine as claimed in claim 10 wherein said corner is disposed for cutting of the slices obliquely across the block transversely of said path of advancement toward said corner.

12. A machine as claimed in claim 11 wherein is provided an anvil at the outermost end of said corner and against which the block is cut during the cutting action which follows said dwell time.

13. A machine as claimed in claim 1 wherein said blade has a leading face and a flat trailing face, said leading face being beveled to present said cutting edge.

14. A machine as claimed in claim 6 wherein said blade has a leading face and a flat trailing face, said leading face being beveled to present said cutting edge and said cutting length.

* * * * *